Sept. 3, 1946.   B. A. WITTKUHNS ET AL   2,406,879
DAMPING ELIMINATOR FOR GYROSCOPIC COMPASSES
Filed April 20, 1939    2 Sheets-Sheet 1
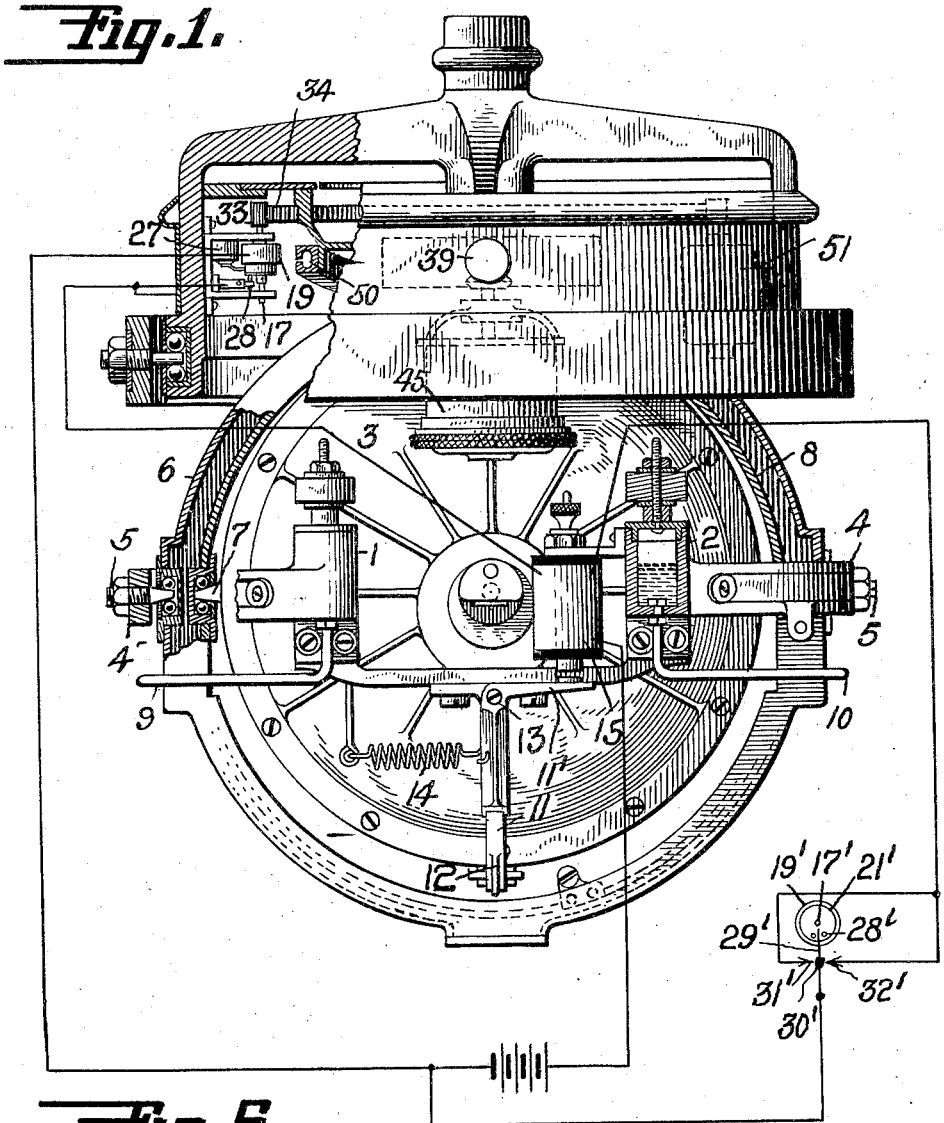
Fig.1.
Fig.6.
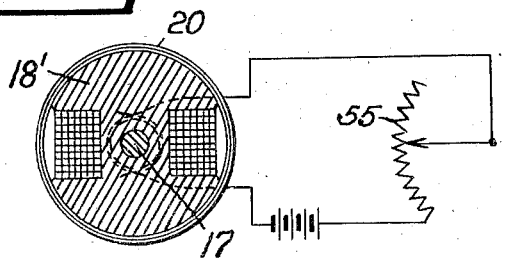
INVENTORS
BRUNO A. WITTKUHNS
PIERRE CHANTEMERLE
BY
Herbert H. Thompson
THEIR ATTORNEY.

Sept. 3, 1946. B. A. WITTKUHNS ET AL 2,406,879
DAMPING ELIMINATOR FOR GYROSCOPIC COMPASSES
Filed April 20, 1939 2 Sheets-Sheet 2
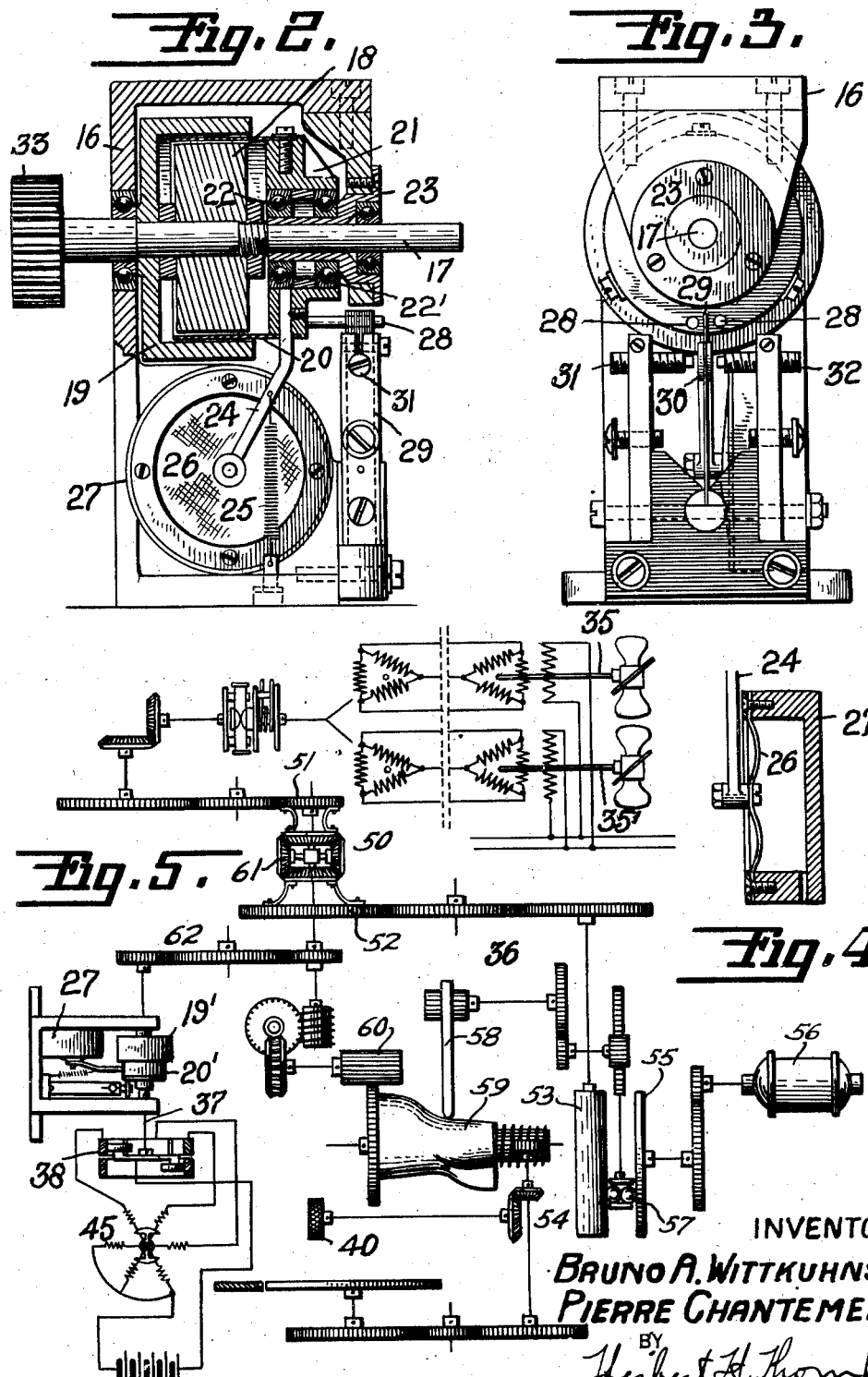

Patented Sept. 3, 1946

2,406,879

UNITED STATES PATENT OFFICE 2,406,879

DAMPING ELIMINATOR FOR GYROSCOPIC COMPASSES

Bruno A. Wittkuhns, Summit, and Pierre Chantemerle, Fort Lee, N. J., assignors to Sperry Gyroscope Company, Inc., Brooklyn, N. Y., a corporation of New York Application April 20, 1939, Serial No. 268,944

2 Claims. (Cl. 33—226)

This invention relates to the art of gyroscopic apparatus for moving vehicles, especially to the art of ships' gyroscopic compasses. In all types of gyroscopes in which a gravitational factor is employed including the gyroscopic compass, it is found desirable to eliminate or vary the damping or erecting torque during marked acceleration of the ship, which in its broad sense, includes any fairly abrupt change in the ship's motion from uniform velocity in a straight line, thus including both turns and change of speed.

Our invention relates particularly to a device adapted to be used to detect either such turns or change in speed, and which is designed to eliminate the damping or erecting factor in both cases. For this purpose, we prefer to employ a device which operates in conjunction with a standard mechanism already employed on the gyro compass, and which is responsive to any substantial movement or change of position of its parts. Our improvement therefore is operated entirely from gyro-compass parts without the use of auxiliary turn detecting gyroscopes or other accelerometers. For detecting the turn, we merely connect our improved device to the azimuth or follow-up ring on the compass so that our device is rotated in one direction or the other whenever the ship makes a pronounced turn, thereby completing a contact to eliminate damping. For performing this function upon change in speed of the ship, we connect a similar device onto that portion of the compass which introduces an automatic speed correction into the correction device, or more broadly speaking, we connect our device to a member the position of which is varied upon change in speed of the ship and the position of which therefore represents or is proportional to the rate of speed.

Our device is so designed, however, as to function only when a definite comparatively fast turn or change of speed is made, since we find that small changes in course or speed do not materially affect the gyro compass and if it is attempted to eliminate the damping for such small change in course, the ordinary yawing of the ship would cause the damping eliminator to go off and on, which might seriously reduce the damping factor.

Referring to the drawings illustrating our invention applied to a gyroscopic compass, Fig. 1 is a south elevation, partly in section, of a gyroscopic compass of the Sperry type.

Fig. 2 is an enlarged detail, partly in section, of our improved movement detecting devices, two of which are used in Fig. 1, one responsive to the turn of the ship and the other to change of speed.

Fig. 3 is an end elevation of the same.

Fig. 4 is a sectional detail of the damping device used for the movable contact.

Fig. 5 is a diagrammatic view showing where my movement detecting device is employed for detecting change of speed of the ship.

Fig. 6 is a detail showing an electromagnetic form of magnet for producing the eddy current drag.

We have illustrated our invention as applied to the type of compass shown in Patent No. 1,854,869, of Herbert H. Thompson, dated April 19, 1932, although it is obviously applicable to any type of compass and any type of damping means. In the type of compass shown, the primary gravitational control is secured through one or more pairs of mercury pots 1 and 2, situated to the north and south, respectively, of the gyro wheel, enclosed in the casing 3, the two north pots not being shown in Fig. 1 as they lie behind the casing 3. The pots are mounted on a common ring 4, pivoted on the horizontal axis 5—5 on the follow-up ring 6, said axis being in line with horizontal axis 7 pivoting the casing 3 in the vertical ring 8. The members of each pair of pots are connected through small bore pipes 9 and 10. The frame work 4 supporting the pots is connected to a point near the bottom of the gyro casing 3 by an arm 11, the point of connection being slightly eccentric for the purpose of damping the compass. In order to eliminate the damping in this type of compass, all that is necessary is to move the arm 11 so that the point of connection 12 to the gyro casing 3 lies exactly in the vertical axis of the gyroscope. Therefore, we pivot the arm 11 at 13 on the framework 4 and normally hold it in its eccentric position by spring 14.

The arm 11 is shown as made in the form of a bell crank lever having a horizontal arm 11'. Above said arm is mounted an electromagnet 15, which when excited rotates the arm counterclockwise in Fig. 1 to bring the connection 12 into the central position, thus eliminating the damping.

The present invention relates particularly to the method of controlling the electromagnet 15 or other means for effecting the elimination of damping during acceleration. The device which we prefer to employ for this purpose is shown in detail in Figs. 2 and 3. This comprises an outer framework 16 in which is journaled a shaft 17. On said shaft is mounted a permanent magnet 18, which may be either circular or rectangular in form, and a hollow cylinder or cup 19 of magnetically permeable material such as soft iron, furnishing a flux path for the lines of force issuing from the poles of the magnet. The inner walls of the cylinder are spaced from the magnet leaving an annular space into which projects a thin walled, hollow cylinder or ring 20 of non-magnetic conducting material such as copper. Said cylinder 20 is shown as secured at its outer end to a circular support 21 of non-magnetic material such as an aluminium alloy, which is journaled by anti-friction bearings 22, 22' on a sleeve 23 secured to the framework 16. Projecting downwardly from the rotatably mounted support 21 is an arm 24 to which a weak centralizing spring 25 may be secured. The outer end of said arm is also shown as connected to a flexible diaphragm 26 of rubber, chamois or the like, which is connected around its periphery to the rim of a cup 27, thereby damping the oscillations of the copper cylinder 20 by the resistance of the air in cup 27.

Projecting from the support 21 is shown a pair of spaced pins 28, projecting to either side of a normally vertical leaf spring 29 on which a central contact 30 is placed, which cooperates with normally stationary, but adjustable contacts 31 and 32. It is readily apparent therefore that upon rotation of shaft 17 in either direction, contact 30 will be moved into engagement with one of contacts 31 or 32 to complete a circuit through electromagnet 15 (Fig. 1), thereby eliminating the damping and that said circuit will be broken as soon as or shortly after shaft 17 stops turning by the action of the centralizing spring 25. In other words, no inter-action takes place between magnet 18 and the copper cylinder unless relative rotation is taking place, at which time a slight drag occurs due to eddy currents set up in the cylinder which displaces the support 21 slightly against the action of weak centralizing spring 25. It will also be noted that a marked rotation must take place in order to produce sufficient drag to displace contact 30 from its normal position sufficiently to engage contact 31 or 32.

To employ our invention as a turn detecting device, we connect the shaft 17 through pinion 33 to the main azimuth or follow-up gear 34 on the gyro compass as shown in Fig. 1, which is turned from azimuth motor 51. For eliminating the damping during speed changes, we connect a similar slip-drag device 19', 20' into a suitable portion of the compass which is moved or shifted upon change of speed of the ship such as an automatic speed change correction device. Such a device is shown diagrammatically in Fig. 5 and more fully described in the copending application William A. Hight and B. A. Wittkuhns, 177,174, filed November 30, 1937, for Automatic correction devices for gyroscopic compasses.

According to this system, the movements of the propeller shafts 35 and 35' are introduced by remote control into a calculating mechanism 36 described in detail in the aforesaid copending application of Hight and Wittkuhns. In brief, said mechanism comprises a differential gear train 50, one arm 51 of which is driven the average speed of the propellers 35, 35'. The opposite arm 52 is driven from a driven element or cylinder 53 of a variable speed device 54, which is shown as consisting of a disc 55 rotated at constant speed from motor 56 and a slidable ball carriage 57 which contacts both said disc 55 and cylinder 53 so that the latter is rotated at a speed governed by the radial position of the balls on said disc 55. Ball carriage 57, in turn, is radially adjusted by means of a cam pin 58 which is lifted by a cam 59. The cam has a longitudinal or axial adjustment for latitude, but for any given latitude it is fixed longitudinally. It is rotated, however, by a pinion 60 which, in turn, is positioned by the middle or planetary arm 61 of said differential 50. The arrangement is such that when the ship is proceeding at uniform speed, the two arms 51 and 52 are revolving oppositely at the same speed so that the central arm 50 stands still. In case, however, the ship's speed increases, for instance, the arm 51 will rotate faster than the arm 52 resulting in the movement of the planetary arm 61 and consequent rotation of the cam to lift the pin 58 and readjust the ball carriage until the speed of the arm 52 matches the speed of the arm 50. The movement of the planetary arm 61 is transmitted through gearing 62 to a shaft 37 of the transmitter 38 which actuates a repeater motor 45 on the gyro compass. Said motor adjusts automatically, the usual setting for both speed changes and latitude changes of the compass affected through the hand knob 39, all of which cooperates with the cosine cam 50 for introducing the proper correction for changes of heading. While latitude changes are also introduced into an automatic mechanism through knob 40, such changes are small and are seldom made, so that they do not seriously interfere with the operation of our invention.

We therefore may drive our motion detecting device 19' directly from shaft 37. This detector as stated above may be substantially the same as used for detecting turns and is connected in parallel thereto to the damping eliminating magnet 15 on the gyro compass. It is also obvious that if it is desired to mount both the turn detecting and change of speed detecting devices on the gyro-compass, the device 19' could be connected to the shaft of the repeater motor 45 instead of to the shaft 37 of the transmitter 38 for said repeater motor.

Instead of employing a permanent magnet 18 to create the magnetic flux field, an electromagnet may be employed as shown in Fig. 6. This has the advantage that the strength of the magnet may be varied at will through a rheostat 55 so that the sensitivity of the device can be readily adjusted to prevent completion of a contact during ordinary yawing of the ship and only permit completing the contact during a marked turn which would create an error in the gyro compass if the damping were not eliminated at that time. Obviously the spring 25 may be also adjusted for the same purpose.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by Letters Patent is:

1. In a ship's gyro-compass having a damping eliminator, an automatic ship's speed correction device for said compass having a part which is readjusted upon change of the ship's speed, a speed responsive device connected to said part, and means actuated thereby for bringing said damping eliminator into action.

2. In a ship's gyro-compass having a damping eliminator, means responsive to a relative turn of the ship with respect to said compass, an automatic ship's speed correction device for said compass having a part which is readjusted upon change of ship's speed, means operated by said turn responsive means for eliminating the damping, and means responsive to said part of said speed correcting device for also eliminating the damping.

BRUNO A. WITTKUHNS.
PIERRE CHANTEMERLE.